Dec. 21, 1926.
R. G. CARDWELL
BELT CLAMP
Filed Feb. 11, 1926
1,611,815
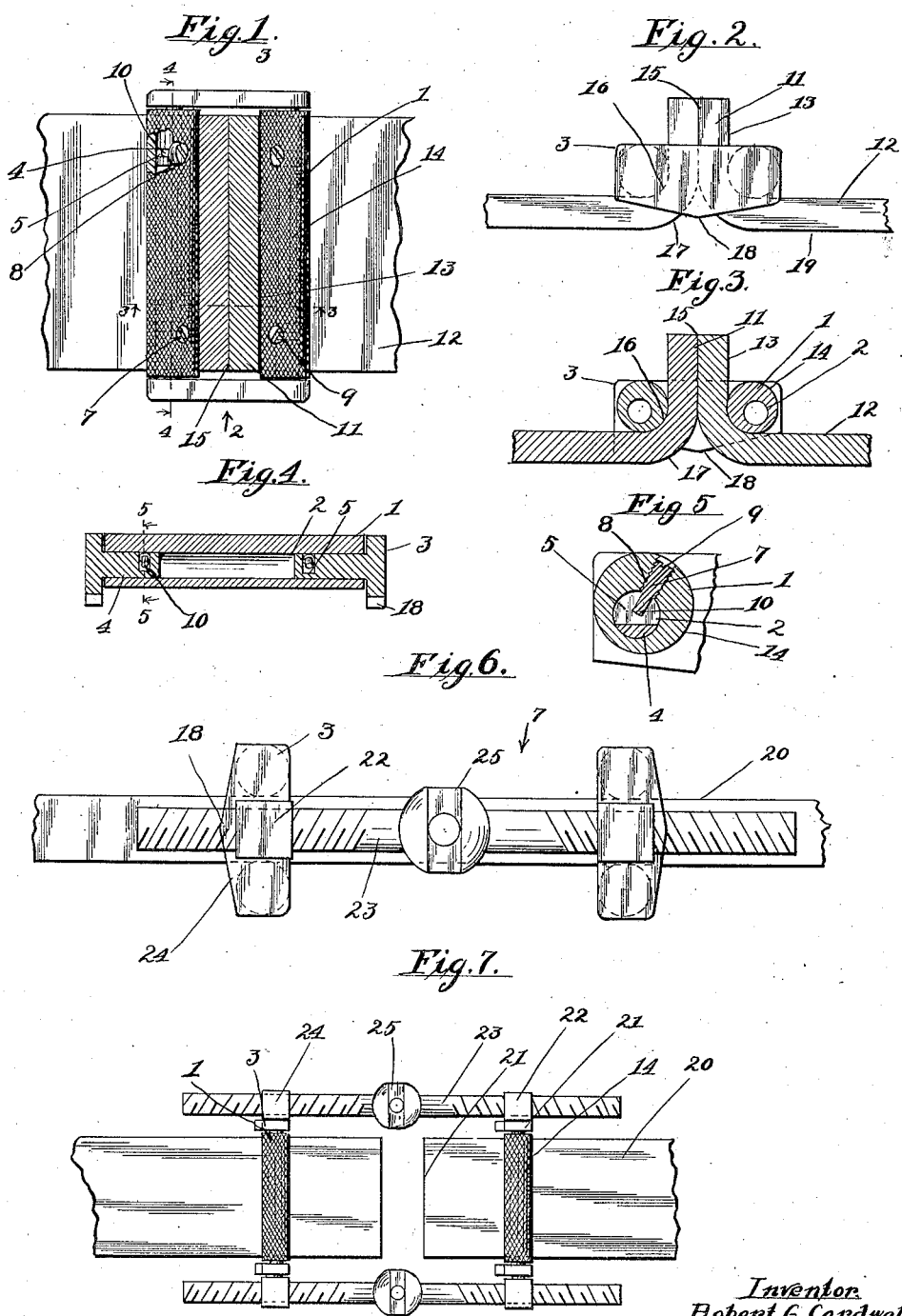

Patented Dec. 21, 1926.

1,611,815

UNITED STATES PATENT OFFICE.

ROBERT G. CARDWELL, OF LA HABRA, CALIFORNIA.

BELT CLAMP.

Application filed February 11, 1926. Serial No. 87,587.

My invention is a belt clamp for power transmitting belts.

An object of my invention is to devise a belt clamp for slow speed belts which transmit considerable power.

Another object of my invention is to provide a clamp for the ends of the belt, the clamp holding the ends securely together and transmitting the strain between the two adjacent ends.

A further object of my invention is a clamp which may be used on thick belts and of the type in which the ends of the belts are turned at right angles to the running line of the belt, my clamp forming an easy turn and thereby eliminating the cracking of the belt at the turn.

In the construction of my invention I make the clamp of eccentrically mounted rolls having a knurled surface to grip the belt, the rollers being readily turnable by hand to allow insertion of the belt ends and when strain is placed on the belt rotating the rollers and thereby tightly clamping the belt.

A further object of my invention is to utilize my belt clamp in a belt tightener or the like.

My invention will be more readily understood from the following description and drawings, in which;

Figure 1 illustrates a plan view of my belt clamp as if taken in the direction of the arrow 1 of Fig. 2.

Fig. 2 is a side elevation of the clamp taken in the direction of the arrow 2 of Fig. 1.

Fig. 3 is a cross section of the clamp on the line 3—3 of Fig. 1.

Fig. 4 is a longitudinal section through one of the rollers on the line 4—4 of Fig. 1.

Fig. 5 is a cross section on the line 5—5 of Fig. 4, illustrating a stop construction.

Fig. 6 is a side view of an alternative use of my belt clamp as a belt tightener.

Fig. 7 is a plan view of Fig. 6, in the direction of the arrow 7, on a smaller scale.

Referring particularly to the belt clamp construction, my invention comprises eccentric clamping rollers 1 having eccentric holes or sockets 2 in the ends extending part way therein, or these may be bored completely through the rollers if desired. Side bars 3 are provided with studs 4 extending into these holes or sockets 2.

There are two side plates each having two studs. The studs are provided with a cross groove 5 preferably of considerable depth compared to the diameter of the studs and stop screws 7 are threaded in apertures 8 extending from the periphery of the rollers into the holes 2 at the position of the sockets 5. These stop screws have a kerf 9 at the outer end and an inwardly projecting end 10 adapted to fit snugly in the groove 5 of the studs.

From the above construction it will be seen that the rollers and the side plates are securely fastened together, the screws 7 preventing their pulling apart and moreover the projecting ends of the screw allow a limited rotation of the rollers on the studs, that is, the rollers are not free to make a full rotation but can only be rotated a predetermined amount in accordance with the size of the grooves 5 and the amount of the inward projection of the ends 10.

The manner of utilizing my belt clamp is illustrated particularly in Figs. 2 and 3. This type of clamp is intended for slow traveling belts conveying considerable power and is particularly adapted for use in oil fields in which thick belts made up of a number of plies of material are utilized. The ends of the belt are drawn together by a suitable belt tightener and the free ends 11 of the belts 12 are passed between the rollers. The rollers may be given a slight turn by hand to bring them into close engagement with the outside surface 13 of the belt and when the belt tightener is loosened and the strain comes on the belt on account of the knurled surface 14 of the rollers these are partially rotated on the studs until they roll inwardly sufficiently towards each other to press the end sections of the belt tightly together; thus forming a belt joint 15 at right angles to the general travel of the belt.

It will be noted that the greater the pull on the belt the greater the tendency to rotate the rollers on the studs and due to the eccentric construction of the rollers, thus gripping the belt ends tightly.

It will be noted that the inner part of the curve 16 of the belt conforms to the circumference of the rollers which are preferably made of considerable size in order to give an easy corner curve and that the outside curve 17 would be concentric to the inside curve; thus giving an easy curve without unduly stretching the material of the belt. This construction prevents cracking of the belt at the outside part of the belt which usually takes place at substantially the point indicated by the numeral 17.

It will be noted that the inner edge 18 of the side bars 3 is situated outside of the inner wearing surface of the belt which engages the pulleys so that the side bars 3 do not in any manner contact with the pulley over which the belt operates.

To loosen my belt clamp all that is necessary is to place belt tighteners on the belt and draw these tighteners up, thereby taking the strain off the rollers which may then readily be manipulated by hand to loosen them from the belt ends and allow removal of the whole clamp.

My belt clamp as applied to a belt tightener is illustrated particularly in Figs. 6 and 7, in which opposite belts are indicated by the numeral 20 having ends 21 which are to be drawn together. In this case the side bars 21 are provided with threaded nuts 22 and right and left screws 23 extend through the nuts of an opposite pair of belt clamps 24. The clamps 24 are of the same construction as above set forth and on account of the eccentric mounting of the rollers on the studs they may turn towards each other gripping the belt with sufficient tightness to hold same. The screw 23 is then turned by the wrench grip 25 until the belts are sufficiently tightened. The belts are loosened by the reverse action.

It will thus be seen that although my belt clamp is of simple construction that it may be adapted to other purposes than clamping the ends of belts together, as it may also be incorporated with a belt stretching device.

It will also be apparent that my invention may be considerably changed in general construction and in specific details without departing from the spirit thereof as set forth in the description, drawings and claims, for instance, the studs on the side plates could extend completely through the rollers if desired, the side plates being thus joined together and the elongated studs being secured preferably integrally to one side plate and detachably secured to the other.

Other changes will be obvious.

It will be noted that the clamping rollers 1 grip and engage the belts by means of the knurled or roughened surface 14 and that no teeth projections or other like devices are necessary. Moreover, the clamping rollers roll into and engage the work due to their eccentric mounting and to the rough surface engaging the belts independent of any mechanism required to turn the rollers by manual manipulation.

Having described my invention, what I claim is:

1. A belt clamp comprising in combination a pair of side plates having inwardly extending studs, rollers eccentrically rotatable on said studs, said rollers having knurled peripheries to engage and grip a belt on partial rotation thereof, and inter-engaging means operated between the rolls and the studs to limit the rotation of the rollers.

2. A belt clamp comprising in combination a pair of side plates having inwardly extending studs, rollers eccentrically rotatable on said studs, said rollers having knurled peripheries to engage and grip a belt on partial rotation thereof, the studs being provided with cross-grooves, and screws having projecting ends inserted through the rollers with the ends fitting in the grooves.

3. A belt clamp comprising in combination a pair of side plates having cylindrical inwardly extending studs. the studs having cross-grooves, a pair of rollers eccentrically journaled on said studs, the rollers having a knurled peripheral surface, threaded apertures in the rollers extending from the periphery towards the studs, stop screws threaded therein, said screws having inwardly projecting ends extending into the cross-grooves, the opposite ends of the screws being adapted when inserted to be within the periphery of the rollers.

4. A belt clamp as claimed in claim 3, having in addition a belt with the free ends extending between the rollers, the belt being gripped by the partial rotation of the rollers, the gripped ends being at substantially right angles to the main portion of the belt.

In testimony whereof I have signed my name to this specification.

ROBERT G. CARDWELL.